(12) United States Patent
Girvin et al.

(10) Patent No.: US 6,600,647 B1
(45) Date of Patent: Jul. 29, 2003

(54) COMPUTER ASSEMBLY HAVING A COMMON HOUSING FOR A CATHODE RAY TUBE AND A LOGIC BOARD

(75) Inventors: Brian J. Girvin, Gilroy, CA (US); Larry Forsblad, Los Altos, CA (US); Brian H. Berkeley, Saratoga, CA (US); Douglas L. Heirich, Palo Alto, CA (US); Steve Cabral, San Jose, CA (US); Robert Norman Olson, Mountain View, CA (US); David Hoenig, San Jose, CA (US); Peter Krause, Singapore (SG)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/917,350

(22) Filed: Jul. 27, 2001

Related U.S. Application Data

(60) Provisional application No. 60/238,110, filed on Oct. 4, 2000.

(51) Int. Cl.[7] .................................................. G06F 1/16
(52) U.S. Cl. .................... 361/682; 361/788; 439/61; 248/636
(58) Field of Search ................................. 361/680, 686, 361/724–727, 788–790, 796, 800, 803–804, 799, 784, 785, 736, 742; 248/632, 634, 636, 638; 439/61, 63, 74

(56) References Cited

U.S. PATENT DOCUMENTS

| | | | | |
|---|---|---|---|---|
| 5,305,183 A | * | 4/1994 | Teynor | 361/686 |
| 5,822,221 A | * | 10/1998 | Groenteman | 364/550 |
| 6,216,999 B1 | * | 4/2001 | Olson et al. | 361/685 |
| 6,465,746 B1 | * | 10/2002 | Kajita | 174/260 |

* cited by examiner

*Primary Examiner*—Darren Schuberg
*Assistant Examiner*—Hung Van Duong
(74) *Attorney, Agent, or Firm*—Blakely, Sokoloff, Taylor & Zafman LLP

(57) ABSTRACT

A computer system is provided comprising a support frame, a logic board mounted to the support frame, a processor on the logic board, a cathode ray tube mounted to the support frame above a plane of the logic board, and a transparent housing located over the cathode ray tube.

30 Claims, 4 Drawing Sheets

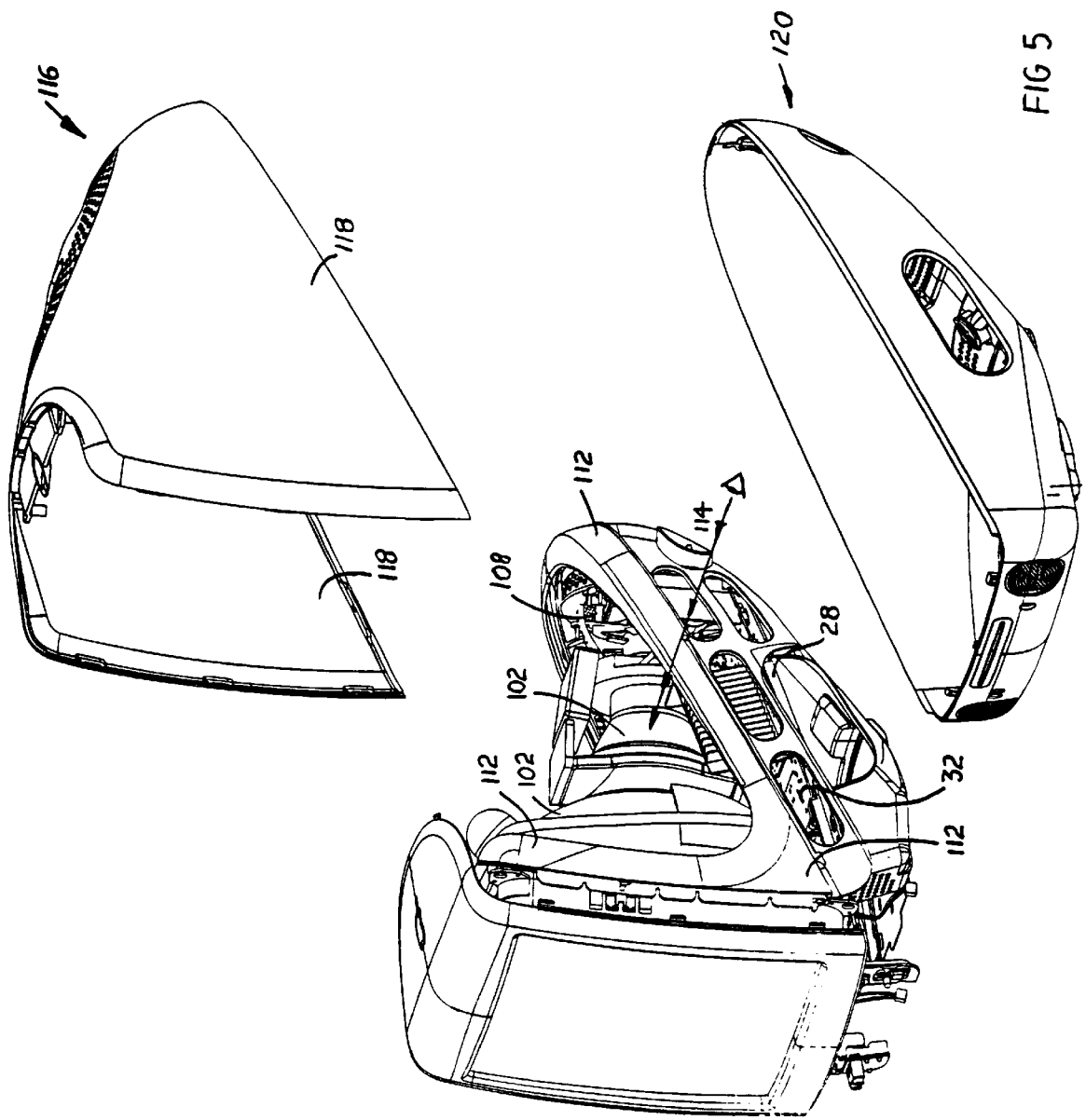

COMPUTER ASSEMBLY HAVING A COMMON HOUSING FOR A CATHODE RAY TUBE AND A LOGIC BOARD

CROSS REFERENCE TO RELATED APPLICATIONS

Priority is claimed from Provisional Patent Application No. 60/238,110 filed on Oct. 4, 2000.

BACKGROUND OF THE INVENTION

1. Field of the Invention

This invention relates to a computer assembly.

2. Discussion of Related Art

A computer usually includes a separate monitor and a separate central processing unit. The monitor usually houses a cathode ray tube and the central processing unit includes a Faraday cage and other components such as a logic processor housed within the Faraday cage. The first model iMac computer by Apple Computer, Inc. of Cupertino, Calif. has a single Faraday cage and cover which encloses both a cathode ray tube and a logic board with a logic processor. A cover serving the purpose of the Faraday cage is made of metal which is non-transparent. Components such as the cathode ray tube are thus not visible though the cover.

SUMMARY OF THE INVENTION

According to one aspect of the invention a computer assembly is provided comprising a divider panel, a logic board, a processor on the logic board, a first signal interface connector on a logic board, an analog board, an analog video cable connected to the analog board, and a second signal interface connector connected to the analog board, the boards being located on opposing sides of the divider panel and substantially parallel thereto and the first and second signal interface connectors mating with one another.

According to another aspect of the invention a computer system is provided comprising a support frame, a logic board mounted to the support frame, a processor on the logic board, a cathode ray tube mounted to the support frame above a plane of the logic board, and a transparent housing located over the cathode ray tube.

DESCRIPTION OF THE DRAWINGS

The invention is further described by way of example with reference to the accompanying drawings wherein:

FIG. 5 is an exploded perspective view of the computer assembly.

DETAILED DESCRIPTION OF THE INVENTION

Figure 1:
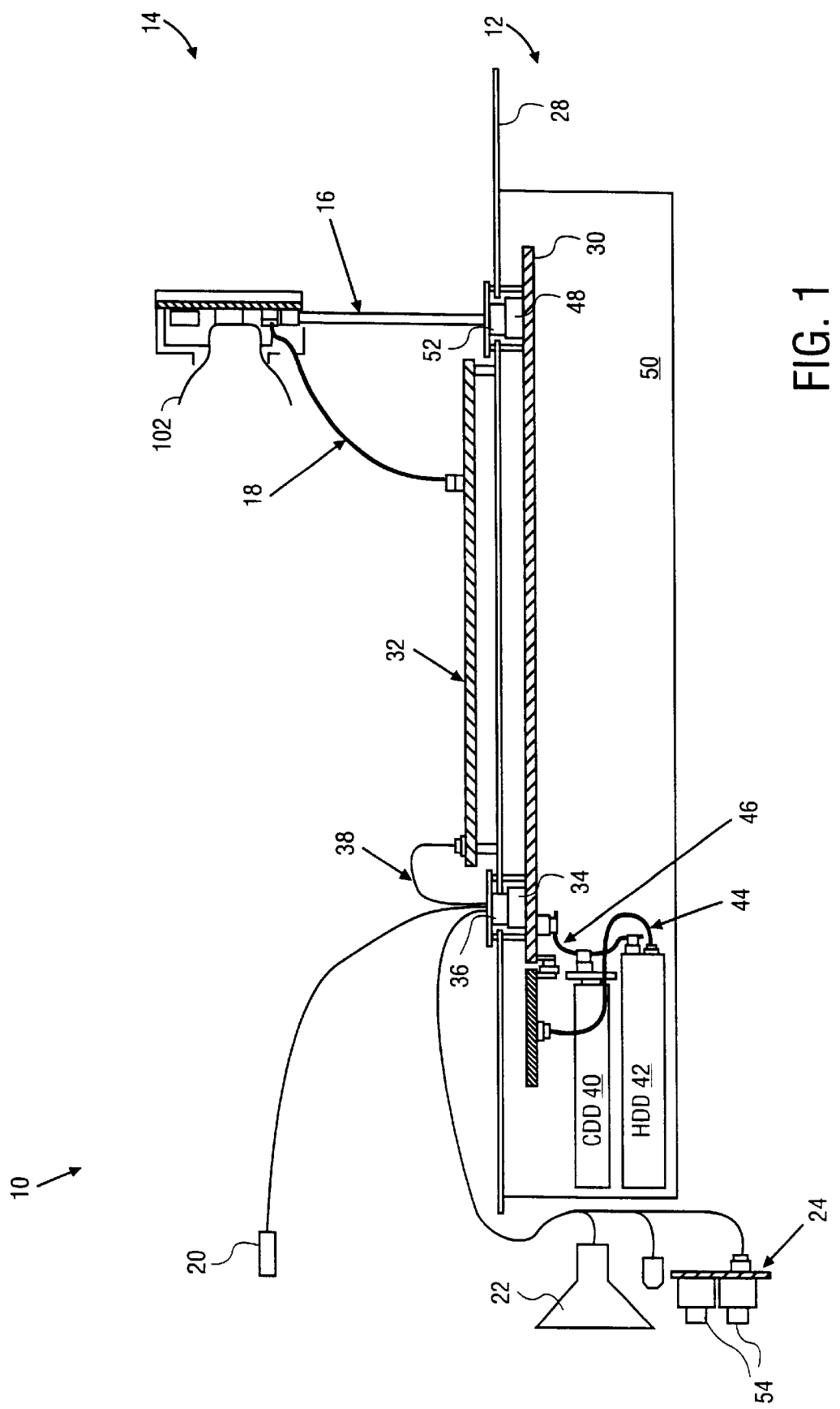
FIG. 1 is a side view of components forming a portion of a computer assembly according to an embodiment of the invention.

FIG. 1 of the accompanying drawings illustrates a portion 10 of a computer assembly according to one embodiment of the invention, including a lower subassembly 12, an upper subassembly 14, a video power cable 16, an analog video cable 18, and peripheral components including a microphone 20, a speaker 22, and a headphone printed circuit board 24.

The lower subassembly 12 includes a divider panel 28, a main logic board 30 and analog board 32, a first signal interface connector 34, a second signal interface connector 36, a shielded power cable 38, a compact disk drive 40, a hard disk drive 42, power and data cables 44 and 46, a first video connector 48, and a Faraday cage 50.

The divider panel 28 is mounted to a support frame (not shown) of the computer system and is located in a horizontal plane. The second signal interface connector 36 is mounted to the divider panel 28. The video power cable 16 has a second video connector 52 at an end thereof which is also mounted to the divider panel 28. Both connectors 36 and 52 can move relative to the divider panel 28 in a plane of the divider panel 28.

A logic processor (not shown), the first signal interface connector 34, and the first video connector 48 are all mounted to an upper surface of the main logic board 30. The main logic board 30 is moved towards the divider panel 28 so that the first signal interface connector 34 mates with the second signal interface connector 36 simultaneously when the first video connector 48 mates with the second video connector 52. Because the connectors 36 and 52 are movable in a plane of the divider panel 28, and allowance is made for tolerances in the positioning of the connectors 34 and 48 relative to one another.

The power cable 44 connects a down converter board 53, mounted and electrically connected to the main logic board 30, to the hard disk drive 42. Power is provided from the down converter board 53 through the power cable 44 to the hard disk drive 42. The data cable 46 connects the main logic board 30 to the compact disk drive 40 and the hard disk drive 42. Data is transmitted between the main logic board 30 and the compact disk drive 40 or the hard disk a drive 42 through the data cable 46. Power is provided from the main logic board 30 through the data cable 46 to the compact disk drive 40.

The Faraday cage 50 has a recessed shaped and is located over the hard disk drive 42, the compact disk drive 40 and the main logic board 30. A rim of the Faraday cage 50 is located again the divider panel 28. The divider panel 28 together with the Faraday cage 50 define an EMI radiation shield around the main logic board 30, the compact disk drive 40, and the hard disk drive 42.

A respective cable connects the microphone 20, the speaker 22, and the headphone printed circuit board 24 to the second signal interface connector 36. Headphone jacks 54 are located on the headphone printed circuit board 24. Audio signals can be transmitted from the main logic board 30 through the connectors 34 and 36 to the speaker 22 and the headphone printed circuit board 24. Signals can also be transmitted from the microphone 20 through the connectors 36 and 34 to the main logic board 30.

The analog board 32 is mounted to the divider panel 28 in a horizontal plane above the divider panel 28. An end of the power cable 38 is connected to the second signal interface connector 36. An opposing end of the power cable 38 is connected to the analog board 32. Signals can be transmitted from the main logic board 30 through the connectors 34 and 36 and the power cable 38 to the analog board 32.

Figure 2:
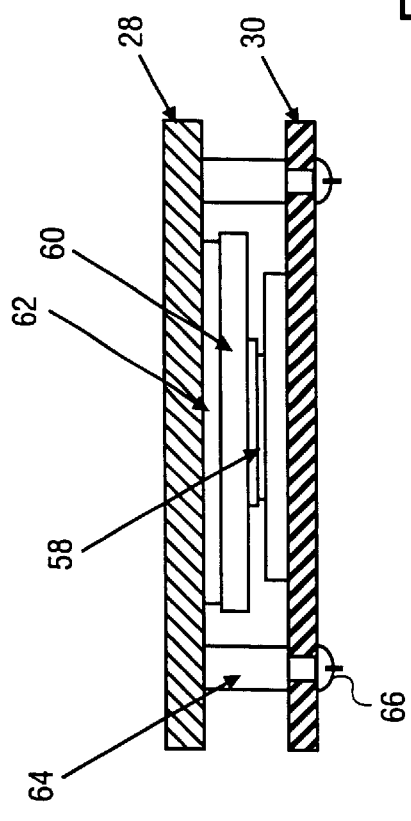
FIG. 2 is a side view of a main logic board, logic processor, and divider panel of the computer assembly.

Referring to FIG. 2, the computer system further includes a logic processor 58, a heat spreader 60, and two compliant thermally conductive pad 62. The processor 58 is mounted to the upper surface of the main logic board 30. One of the thermally conductive pads 62 is located on heat spreader 60 between the heat spreader 60 and processor 58. Another one of the thermally conductive pads 62 is located on the heat spreader 60 between the heat spreader 60 and the divider panel 28. The heat spreader 60 is located with two thermal pads 62 between the divider panel 28 and processor 58. A standoff 64 is located between the divider panel 28 and the main logic board 30. The thermally conductive pads 62 are compressed until opposing ends of the standoff 64 contact the divider panel 28 and the main logic board 30, respectively. A spacing between the divider panel 28 and the main logic board 30, and therefor an extent to which the heat thermally conductive pads 62 are compressed, is controlled by the standoff 64. Screws 66 are inserted through the main logic board 30 into the standoff 64 and into a divider panel 28, thereby securing the main logic board 30 to the divider panel 28.

Heat is generated by the processor 58 when being operated. The heat is conducted from the processor 58 sequentially through one of the thermally conductive pads 62, the heat spreader 60 and the thermally conductive pad 62 to the divider panel 28. The heat is convected from the divider panel 28 to ambient. The divider panel 28 thus serves the additional purpose of a heat sink for the processor 58.

Figure 3:
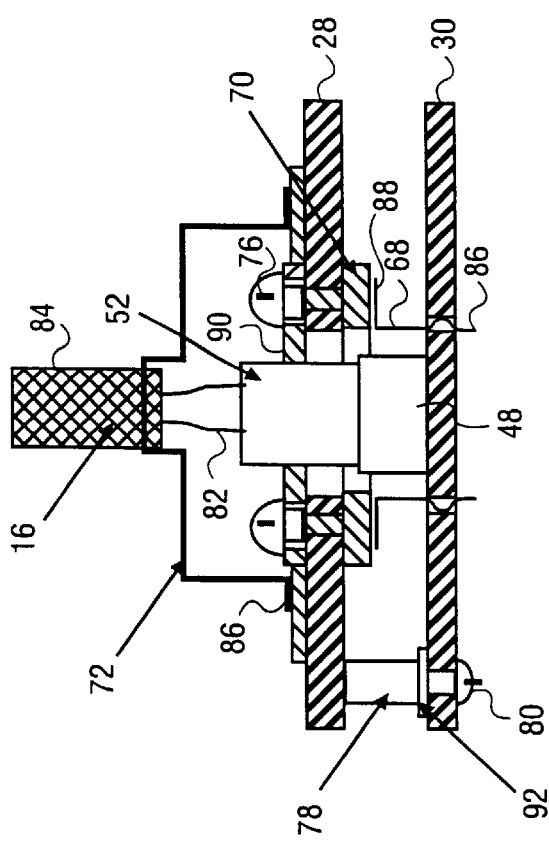
FIG. 3 is a sectioned side view illustrating an electromagnetic interference (EMI) radiation shield over connectors of the computer assembly.

FIG. 3 illustrates in more detail an area of the computer system at the connectors 48 and 52. The computer system further includes a connector surround shield 68, an EMI foam gasket 70, an interconnect shield 72, shoulder screws 76, standoffs 78, and attachment screws 80.

The video power cable 16 is a coaxial cable having a conductive core 82 and a braided shield cover 84 surrounding the core 82. The interconnect shield 72 has an opening therein which is located over the shield 84 and soldered thereto. The interconnect shield 72 is thereby electrically connected to the braided shield 84. A portion 85 of the interconnect shield 72 surrounds the connector 52 and is electrically connected to the divider panel 28. The shoulder screws 76 attach a non-conductive pad 90 which is connected to the connector 52 to the divider panel 28.

The connector surround shield 68 has a portion 86 which connects it to the main logic board 30 and another portion 88 located distant from the portion 86 and surrounding the connector 48. The EMI foam gasket 70 is located against the divider panel 28 and is compressed between the portion 88 and the divider panel 28. The standoff 78 is located between the divider panel 28 and the main logic board 30. The EMI foam gasket 70 is compressed until opposing surfaces of the standoff 78 contact the divider panel 28 and a chassis ground pad 92 on the main logic board 30, respectively. The standoff 78 serves the dual purpose of electrically connecting the divider panel 28 to the chassis ground pad 92, and controlling the spacing between the divider panel 28 and the main logic board 30 so as to control a degree of compression of the EMI foam gasket 70.

It can be seen that an EMI radiation shield is formed around the connectors 52 and 48 by the connector surround shields 68, the EMI foam gasket 70, and the interconnect shield 72 which is soldered to the braided shield 84. The EMI radiation shield is electrically connected through the divider panel 28 and the standoff 78 to the chassis ground pad 92 on the main logic board 30. The chassis ground pad 92 is connected to other devices which regulate EMI radiation.

Only the detail around the connectors 48 and 52 is shown in FIG. 3. It should however be understood that a similar EMI radiation shield is formed around the connectors 34 and 36 shown in FIG. 1.

Figure 4:
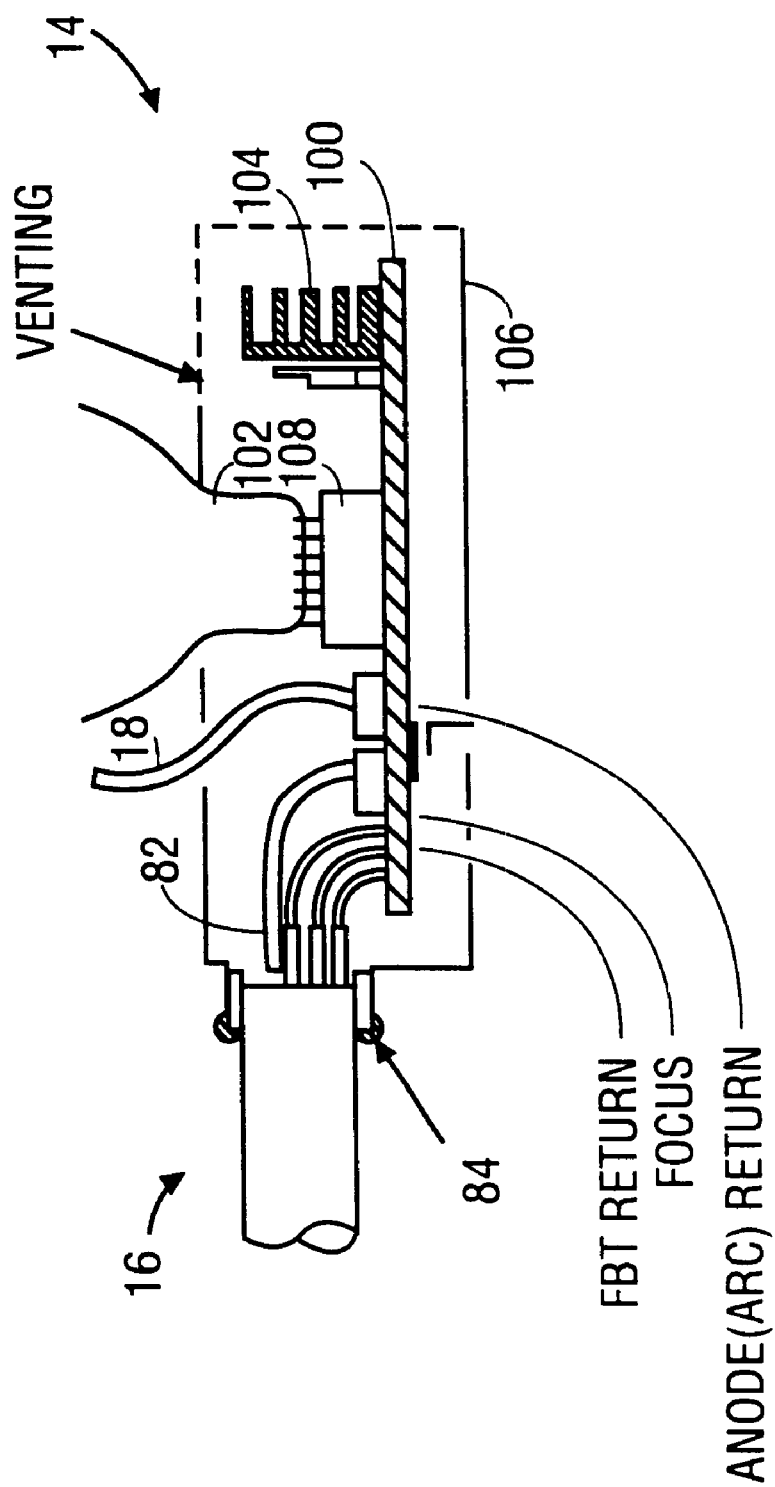
FIG. 4 is a cross-sectional side view of an upper subassembly of the components of the computer assembly shown in FIG. 1.

FIG. 4 illustrates the upper subassembly 14 in more detail. The upper subassembly 14 includes a display printed circuit board 100, a cathode ray tube 102, a heat sink 104, an EMI radiation cover 106 and a cathode ray tube adapter 108. The display printed circuit board 100, heat sink 104 and adapter 108 are located in the EMI radiation cover 106. The heat sink 104 and the cathode ray tube adapter 108 are mounted to the display printed circuit board 100. External leads for FBT return, focus and anode (ARC) return are also connected to the display printed circuit board 100. The analog video cable 18 is also connected to the display printed circuit board 100.

An end of the video cable 16 is inserted through an opening in the EMI radiation cover 106. The EMI radiation cover 106 is soldered to the braided shield 84. The braided shield 84 is thereby electrically connected to the EMI radiation cover 106. Wires of the core 82 of the video cable 16 are connected to the display printed circuit board 100.

Referring to FIG. 5, the cathode ray tube 102 is mounted to the support frame 112 of the computer system above the analog printed circuit board 32. The adapter 108 is then connected to the cathode ray tube 102.

When viewed horizontally from the side in a direction 114, the components of the lower subassembly 12 do not obscure the cathode ray; tube 102. A cover 116 is then located over the cathode ray tube 102 and the lower subassembly 12. The cover 116 is then mounted to the support frame 112. The cover 116 has sidewalls 118 that are transparent. The cathode ray tube 102 can be viewed through the sidewalls of the cover 116. A translucent shell 120 is located over the support frame 112.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer assembly comprising:
   a divider panel;
   a logic board;
   a logic processor on the logic board;
   a first signal interface connector on the logic board;
   an analog board;
   an analog video cable connected to the analog board; and
   a second signal interface connector connected to the analog board, the boards being located on opposing sides of the divider panel and substantially parallel thereto and the first and second signal interface connectors mating with one another.

2. The computer assembly of claim 1 further comprising:
   a first video connector connected to the logic board; and
   a second video connector connected to the divider panel, the first and second video connectors mating with one another.

3. The computer assembly of claim 1 wherein the processor faces towards the divider panel and is thermally connected to the divider panel.

4. The computer assembly of claim 1 further comprising:
   a display located above the panels and the divider panel.

5. The computer assembly of claim 1 wherein the display is a cathode ray tube.

6. The computer assembly of claim 1 further comprising:
a power cable connecting the second signal interface connector to the analog board.

7. The computer assembly of claim 1 further comprising at least one of a microphone, a headphone board and a speaker connected to the second signal interface connector.

8. The computer assembly of claim 1 further comprising:
a Faraday cage located over the logic board, the divider panel and the Faraday cage forming an EMI radiation shield around the logic board and the processor which substantially attenuates EMI radiation therefrom.

9. The computer assembly of claim 2 wherein one of the connectors is movable in a plane of the divider panel to allow for simultaneous mating of the signal interface connectors with one another and the video connectors with one another.

10. The computer assembly of claim 3 wherein heat is transferred from the processor to the divider panel primarily through conduction.

11. The computer assembly of claim 4 further comprising:
an analog video cable connecting the analog board to the display.

12. The computer assembly of claim 8 wherein the EMI radiation shield attenuates at least 90% of all radiation from the logic board and the processor.

13. The computer assembly of claim 11 further comprising:
a disk drive within the EMI radiation shield.

14. The computer assembly of claim 8 further comprising:
a first video connector on the logic board; and
a video cable having a second video connector secured to the divider panel and mating with the first video connector, the video cable being located externally of the Faraday cage.

15. The computer assembly of claim 13 wherein the disk drive is a hard disk drive.

16. The computer assembly of claim 13 wherein the disk drive is a compact disk drive.

17. The computer assembly of claim 13 further comprising:
a down converter connected to the logic board; and
a power cable connecting the disk drive to the logic board.

18. The computer assembly of claim 13 further comprising:
a data cable connecting the disk drive to the logic board.

19. The computer assembly of claim 18 wherein the video cable is an EMI radiation shielded cable with a shield cover.

20. The computer assembly of claim 14 wherein the logic board has a ground pad, further comprising:
a connector surround shield over the first video connector and electrically connected to the ground pad and the divider panel, the interconnect shield attenuating EMI radiation from the second video connector.

21. The computer assembly of claim 14 further comprising:
a display, the video cable being connected to the display and providing data for viewing on the display.

22. The computer assembly of claim 19 further comprising:
an interconnect shield over the second video connector and electrically connected to both the shield cover and the divider panel, the interconnect shield attenuating EMI radiation from the second video connector.

23. The computer assembly of claim 20 wherein the display is a cathode ray tube and the divider panel is located below the cathode ray tube.

24. The computer assembly of claim 22 wherein the interconnect shield is soldered to the shield cover.

25. The computer assembly of claim 24 further comprising:
an EMI radiation shielding gasket between the divider panel and the connector surround shield.

26. The computer assembly of claim 24 wherein the logic board has a ground pad and the divider panel is electrically connected to the ground pad.

27. The computer assembly of claim 25 wherein the logic board and the analog board are located below the display.

28. A computer assembly comprising:
a support frame;
a logic board mounted to the support frame;
a logic processor on the logic board;
a cathode ray tube mounted to the support frame; and
a housing located over the cathode ray tube having a side panel through which the cathode ray tube can be viewed in a horizontal direction.

29. The computer assembly of claim 28 wherein the plane of the logic board is substantially horizontal.

30. The computer assembly of claim 28 wherein the logic board is located in the housing.

* * * * *